Dec. 4, 1951     LE ROY H. FRAILING     2,577,413
TRANSMISSION MECHANISM

Filed April 10, 1945                                         2 SHEETS—SHEET 1

INVENTOR.

BY *Le Roy H. Frailing*

*Sibbetts & Hart*

ATTORNEYS

Dec. 4, 1951 LE ROY H. FRAILING 2,577,413
TRANSMISSION MECHANISM
Filed April 10, 1945 2 SHEETS—SHEET 2
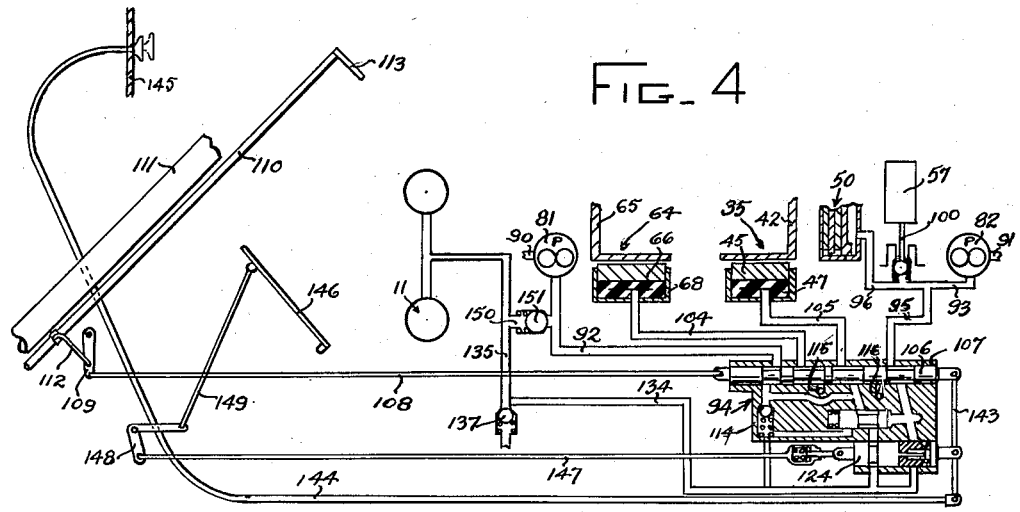
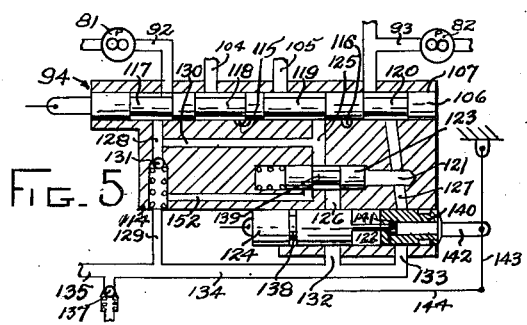
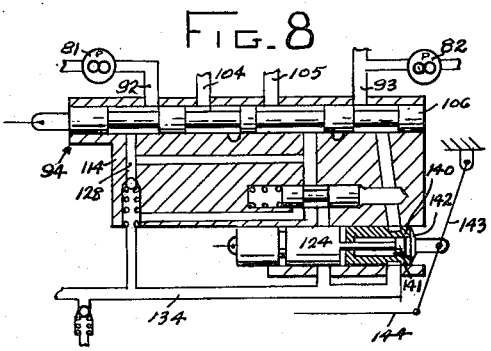
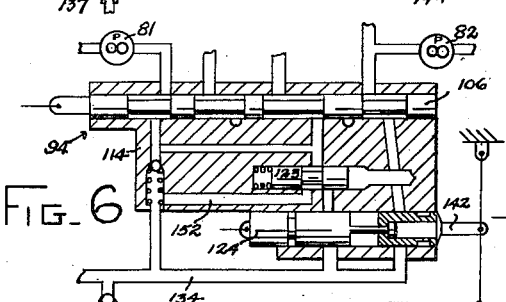
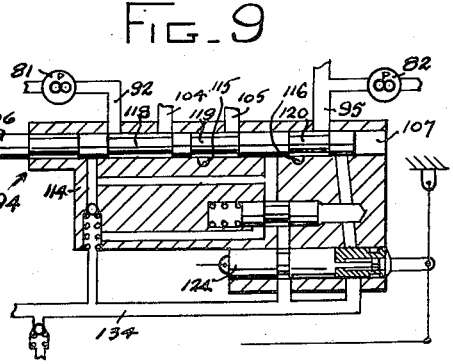
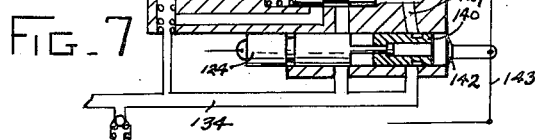
INVENTOR.
Le Roy H. Frailing
BY
Tibbetts & Hart
ATTORNEYS Patented Dec. 4, 1951

2,577,413

UNITED STATES PATENT OFFICE 2,577,413

TRANSMISSION MECHANISM

Le Roy H. Frailing, Detroit, Mich., assignor to Packard Motor Car Company, Detroit, Mich., a corporation of Michigan Application April 10, 1945, Serial No. 587,523

5 Claims. (Cl. 74—732)

This invention relates to transmission mechanism that may be conditioned to drive either forwardly or reversely.

An object of the invention is to provide a compact transmission mechanism of the type referred to through the use of planetary gearing having forward and reverse control brake devices concentric with and telescoping the end portions thereof.

Another object of the invention is to provide transmission mechanism with fluid control means operable to condition change speed gearing for forward or reverse drive.

Another object of the invention is to provide a fluid control system for change speed gearing in which a valve selects forward or reverse drive through the gearing and other valves select the driving speed of the gearing.

A further object of the invention is to provide a single engagement clutch between a driven member and forward and reverse gearing connected to a fluid clutch that can be engaged to establish either the forward or the reverse drive.

Other objects of the invention will appear from the following description taken in connection with the drawings, which form a part of this specification.

Fig. 1 is a sectional view of a transmission mechanism incorporating the invention;

Fig. 2 is a sectional view of a brake device taken on line 2—2 of Fig. 1;

Fig. 3 is a sectional view of the torque-speed control and connecting device between two shafts taken on line 3—3 of Fig. 1;

Fig. 4 is a diagrammatic view of the devices controlling the transmission mechanism for neutral;

Figs. 5 to 9 show the valve device diagrammatically in various positions of adjustment.

Referring to the drawings by characters of reference, the power transmission mechanism as shown comprises generally a rear portion of the housing of an internal combustion engine 10, fluid coupling 11, planetary gearing 12 and clutch means 13.

The engine crankshaft 14 is fixed to the fluid coupling impeller 15 which acts as the driver for two runners 16 and 17 associated with drive shafts 18 and 19 for driving the planetary gearing, such mechanism comprising the power input means. The planetary gearing is connected to power output means consisting of driven shaft 20, tail shaft 21 and propeller shaft 22 for operating a conventional vehicle drive axle (not shown), the tail shaft and propeller shaft being connectible by clutch means 13. Runner 16 is drivingly connected with shaft 18 by a spring type overrunning clutch 24 while runner 17 is splined at 25 to shaft 19.

The planetary gearing includes drive gear 26 fixed to rotate with shaft 18, drive gear 27 fixed to rotate with shaft 19 and driven gear 28 splined to shaft 20 at 23. Planet gear 29 meshes with gear 26, planet gear 30 meshes with gear 27 and planet gear 31 meshes with gear 28. There is also a planet gear 32. These planet gears may be formed separately and fixed together or they may be formed integral as shown and are referred to as a planetary unit. There may be one or more of these units rotatably mounted on pins 33 fixed to the carrier. The ratios of the pairs of gears 27, 30 and 26, 29 are such that the drive through each pair is different. Fluid in the coupling 11 is circulated by impeller 15 first through runner 16 and then runner 17 in series, such coupling operating on the Fottinger principle. The shaft 18 will first be driven through clutch 24 to provide low speed drive through gears 26, 29, 31 and 28 and as the impeller speed and fluid pressure increases the second runner 17 will drive shaft 19 and through gears 27, 30, 31 and 28 will take over the drive at a higher speed. As the planet units are integral, shaft 19 will, when it takes over, drive the planet units at a speed that will cause shaft 18 to overrun runner 16. The planetary gearing will be ineffective to drive through the pairs of gears unless the carrier is held to prevent is retrograde rotation and brake means 35 is provided for this purpose.

The fluid coupling 11, gearing 12 and clutch means 13 are housed in a casing comprised of sections 36, 37 and 38. Casing section 36 encloses the fluid coupling and is fixed to the engine housing 10, casing section 37 encloses the change speed gearing 12 and casing section 38 encloses the clutch means. The rear wall 39 of casing section 36 serves to support the drive shafts 18 and 19 while the wall 40 of casing section 37 serves to support shaft 20 which pilots in sleeve 41 extending rearwardly from gear 28. Carrier 34 is rotatably mounted at one end sleeve 41.

Brake means 35 is designed to prevent retrograde rotation of the planetary gearing carrier 34. Brake drum 42 is fixed to the carrier 34 and is adapted to be engaged or released by sectional band 45 carried in casing 46 fixed to casing 37. Within the casing is fixed a rubber tube 47 for receiving fluid whereby it will expand and contract the band on the drum, the band being normally expanded to disengage by springs 48 anchored to adjacent brake band sections as shown in Fig. 2. When the band 45 is engaged, retrograde rotation of the carrier 34 is prevented. When the band 45 is released, the brake drum 42 is free and the carrier 34 to which it is fixed is free to rotate in either direction.

Third speed or direct drive through the planetary gearing is obtained by locking two elements of the planetary gearing so that it will rotate as a unit. This drive is obtained by clutch means 50 locking the carrier 34 to shaft 20 through clutch housing 51 secured to flange 52 on shaft 20 by bolts 53. Carrier 34 is splined to clutch member 54 and such member and housing 51 are slotted to receive tongues of alternate clutch plates 55 and a pressure ring 56 is actuated to engage the clutch plates to establish direct drive. The pressure ring is normally disengaged by coil springs 79.

The connection between flange 52 on shaft 20 and shaft 22 includes a torque-speed control device, see Fig. 3. Flyweights 57 are carried by bushings 58 mounted on bolts 53. Arms 59 extend from shaft 21 and are slidably mounted in slots formed in cylindrical members 60 rotatably mounted in sleeves 61 fixed to the flyweights. In first and second speed, the drive passes from shaft 20 and its flange 52 and bolts 53 to the flyweights 57 and through members 60 and sleeves 61 to arms 59 of shaft 21, the carrier 34 being held stationary. When the clutch is engaged for high speed, the brake means 35 is disengaged and the entire planetary gearing is locked together with the drive flowing from shaft 20 as in second speed and also through the carrier and clutch to the flange 52.

Planetary gear 32 meshes with gear 63 rotatably mounted on shaft 19. When this gear 63 is released it will be driven idly by the planetary unit but when braked it will cause the planetary units to turn rearwardly and thereby drive shaft 20 in reverse. Brake means for gear 63 is indicated generally by numeral 64, see Figs. 1 and 2. The gear 63 is provided with a drum 65 on which the forward end of carrier 34 has a bearing and has a rim adapted to be engaged or released by brake means similar to that employed for braking the carrier. A sectional band 66 is mounted in casing 67 fixed to casing 37 and is normally expanded to release drum 65 by spring members 48 acting upon adjacent ends of the band sections. A rubber tube 68 is arranged between casing 67 and the brake band and when the tube is inflated it will contract the brake band to engage and hold the drum 65 and gear 63 stationary.

The brake means for holding the carrier 34 and the reverse gear 63 are similar, concentric and arranged at opposite ends of the planetary gearing with their drum rims extending toward the central portion of the gearing and in telescoping relation with the end portions of the gearing. The construction provides a compact structure with relatively large brake surfaces so that the diameter and overall length of the transmission mechanism can be relatively small. This arrangement of the reverse drive mechanism will occupy unused space so that overall length of the transmission is not increased for this purpose.

The clutch means 13 is operative to entirely disconnect or to establish the drive between shafts 21 and 22 when the planetary gearing is conditioned for either forward or reverse drive. One of the clutch members is formed as a disk 70 on the forward end of the propeller shaft 22 and the shiftable clutch member 71 is slidably splined on shaft 21 and has teeth 72 adapted to engage with teeth 73 on the disk. The member 71 has a flange portion that may be engaged by suitable manually operable shift mechanism (not shown), and also for use as a part of synchronizing mechanism. Synchronizer disk 74 has an internal cone friction surface 75 for engaging a similar peripheral surface on disk 70 to bring shafts 21 and 22 to the same speed before engaging the teeth 72 with teeth 73. The disk 74 is located between the flange of clutch member 71 and the disk 70 while another synchronizer disk 76 is located in advance of the flange of the clutch member 71. These synchronizer disks have a multi-diameter pin 77 fixed thereto that passes through opening 78 in the clutch member flange. Such opening is of larger diameter than the pin therein and has a beveled end portion facing a similar beveled surface 80 on the pin. An angular spring 81' passes through the flange opening and engages the synchronizer disks. As the clutch flange is shifted to engage teeth 72 with teeth 73, it bears against spring 81' and will shift the synchronizer structure to press disk 74 into frictional engagement with disk 70. The synchronized structure will be held by the propeller shaft and rotated thereby, should the vehicle be moving at that time, while beveled surface 80 of pin 77 will overlie a portion of the beveled end of the flange opening to block further movement of the clutch member to engage the clutch teeth. When the speed of the shaft 21 is brought to the same speed as shaft 22 and then slightly beyond, the reversal of direction of drive will cause the beveled surface 80 of pin 77 to move out of its overlying position with respect to the beveled end of the flange, thereby freeing the clutch member and permitting it to continue on to engage teeth 72 with teeth 73 to provide a positive drive connection. Should engagement of teeth 72 with teeth 73 be desired when shaft 22 is stationary so that there is no relative reversal of direction of rotation between shafts 21 and 22, the pin 77 can be forced out of blocking position by increased pressure on the clutch flange which in turn forces beveled surface 80 of pin 77 to move along the beveled end of the flange opening until the pin is free of the flange.

The brakes 64 and 35 and the clutch 50 are controlled by a hydraulic system in which fluid flow may be selected for forward or reverse drive by manually operated means. The three driving speeds through the planetary gearing may be automatically established, as dictated by vehicle operating conditions, in either forward or reverse drive.

The hydraulic system includes two star type pumps 81 and 82, see Figs. 4 to 9. Pump 81 has one rotor 83 splined to a housing section 84 of the impeller 15 and another rotor section 85 mounted to rotate freely in a chamber between casing wall 39 and a cover plate 86. Pump 82 has one rotor 87 splined to tail shaft 21 and another rotor section 87' mounted to rotate freely in a chamber between wall 88 and cover plate 89. Pump 81 has a fluid intake conduit 90 and pump 82 has an intake conduit 91, such conduits being connected with a suitable source of fluid such as the sump for lubricating oil in the transmission mechanism. Pump 81 has an outlet conduit 92 and pump 82 has an outlet passage 93, such passages leading to the housing 114 of the flow control device 94. Conduit 93 also connects with passage 95 extending axially through shaft 21 and communicating at one end with passage 96 that is open to chamber 97 in flange 52 in which is mounted piston 98 for actuating the clutch pressure plate 56, see Fig. 1. Passage 95 is connected with a passage 99 extending radially to the exterior of shaft 21 beneath one of the flyweights 57 and a stem 100, fixed to such flyweight, is movable in the radial passage. The stem is engageable with a ball valve 101 normally urged to engage a seat member 102 by coil spring 103, see Fig. 3. When the valve is seated fluid from pump 82 flows to chamber 97 and acts against piston 98 to engage clutch 50 but when the valve is open the fluid will flow through radial passage 99 and passage 96 will be relieved so that springs 79 will disengage clutch 50. As one of the flyweights actuates stem 100, the valve 101 will be controlled in accordance with the flyweight position which is controlled by torque and speed. Engine torque acting through shaft 20 and pins 53 tends to hold the flyweights inwardly while the speed of shaft 21 acting through arms 59 acts to move the flyweights outwardly and these oppositely acting forces will determine the pivotal position of the flyweights to thus control the position of valve 101.

Conduit 104 connects the interior of brake tube 68 with the control device housing 114 and conduit 105 connects the interior of tube 47 with the control device housing, such conduits being selectively connectible with pump 81 by the shifting of a cylindrical valve 106 arranged in a bore 107 in the control device housing 114. The pump outlet conduits 92 and 93 and the brake inlet conduits 104 and 105 are all arranged in spaced relation and in communication with bore 107. Valve 106 is preferably shifted by mechanism operable by the vehicle driver. Such mechanism comprises a link rod 108 pivoted to the valve and a lever 109, a control rod 110 extending adjacent steering column 111, a link 112 connecting lever 109 with the rod and an arm 113 on the rod to be manipulated by the vehicle driver. Valve 106 will be shifted axially of link rod 108 when rod 110 is rotated through means of link 112 and lever 109. The control device housing has a vent port 115 leading from the bore between conduits 104 and 105 and another vent port 116 leading from the bore adjacent conduit 93.

Valve 106 has a plurality of reduced diameter portions 117, 118, 119 and 120 along its length that are spaced to provide a fluid flow selection for establishing either forward or reverse drive through the planetary gearing.

The control device housing also has bores 121 and 122 in which are mounted valves 123, 124, and 140. These valves are parallel with the forward and reverse valve. Passage 125 connects bores 107 and 121, passage 126 connects bores 121 and 122 and passage 127 connects bores 107, 121 and 122. Passage 128 extends from bore 107 through one end of the housing and communicates with conduit 129. Passage 130 in the housing connects passages 128 and 125 between bores 107 and 121 and a spring seated valve 131 is arranged in passage 128 between passage 130 and conduit 129. Vent conduits 132 and 133 connect the bore 122 with conduit 134 which communicates with conduit 135 leading to passage 136 communicating with the interior of the fluid coupling 11. Pressure relief valve 137 is arranged in conduit 135. Valve 124 has a reduced diameter portion 138 and valve 123 has a reduced diameter portion 139. Passage 152 in the housing connects bore 121 with passage 128 between valve 131 and passage 129.

Sleeve valve 140 is mounted in bore 122 and the head extension 141 of valve 124 is slidably mounted therein. An actuator 142 abuts the end of valve 140 and is pivotally connected to lever 143 connected to a Bowden wire actuator 144 extending to the vehicle instrument board 145. Valve 124 is connected with the engine accelerator pedal 146 by linkage 147, bell crank 148 and link 149.

Conduit 150 connects conduits 92 and 135. A spring seated valve 151 is arranged in conduit 150. This valve 151 will remain seated until a high fluid pressure is developed in conduit 92, such pressure being for example 450 lbs. Valve 137 is arranged to be unseated at a low pressure, for example 5 lbs. and valve 123 is arranged to be shifted against the action of its spring when pressure in passage 127 reaches 80 lbs. Valve 131 will be seated until the pressure in conduit 128 reaches a medium pressure, for example 180 lbs.

The drive from the transmission can be established or broken by shifting clutch 13. When the clutch is shifted to engage teeth 72 with teeth 73 the driving connection between shafts 21 and 22 will be established and when such teeth are disconnected the drive between such shafts will be broken. Forward or reverse drive may be selectively established by the position of valve 106 and such valve is shifted axially by the vehicle driver turning arm 113 to rotate shaft 110. Three driving speeds can be established automatically through the transmission mechanism. Provision is made to overrule the high speed drive and establish a lower speed drive through operation of the accelerator 146. Provision is made to provide a positive drive in first or second speed, such positive drive and the shift from high to second speed drive being obtainable even though the automatic controlling means dictates that the high speed clutch 50 should be engaged.

Neutral is obtainable in the transmission mechanism when the clutch 13 is disengaged. If the vehicle is standing still and the engine is operating pump 82 will be inactive but pump 81 will be driven by the housing section 84 of the impeller 15. The control mechanism and its adjustment for neutral is shown in Fig. 4. As pump 82 is not operating there will be no fluid pressure exerted against clutch 50. The selector valve 106 will be in forward driving position so that conduit 104 leading to the brake for establishing reverse drive will be open to vent 115 so that there will be no fluid pressure acting to hold the reverse brake drum to establish reverse drive. Fluid from pump 81 will pass through conduit 92 and past the reduced portion 117 of the selector valve into passage 128 from which it will flow through passages 130, 125, bore 121 and passage 126 to bore 122 and around the reduced portion 138 of valve 124 to the vent conduits 132 and 134. Thus fluid is vented through conduit 105 to tube 47 and the brake band 45 will be disengaged from brake drum 42 thereby leaving the carrier 34 free to rotate in a reverse direction so that no drive will be imparted from the planetary gearing to shaft 20. As soon as the accelerator pedal is pressed down it will shift valve 124 in a direction closing passage 126 so that fluid will flow to tube 47 and engage the associated band 45 with drum 42 thereby conditioning the planetary gearing for first or second speed drive provided clutch 13 is engaged. Thus when in neutral there will be no fluid flow to either one of the brake bands or to the clutch, so even though the clutch 13 is engaged there will be no drive from the planetary gearing to shaft 21. Of course disengagement of clutch 13 will prevent any driving connection from the planetary gearing to shaft 22 and with the clutch 13 engaged and the accelerator pedal released the planetary gearing will not be conditioned to drive. With this arrangement the driver of a vehicle may come to a standstill at a stop light and if he does not disengage clutch 13 the vehicle will remain stationary but will start up in first immediately upon depression of the accelerator pedal as this will discontinue venting of conduit 105.

Fig. 5 shows the control device in its position of adjustment whereby first or second speed drive from the planetary gearing to shaft 22 is obtained. It must be assumed that clutch 13 is engaged and that the speed of the vehicle is below that which will cause the flyweights 57 to move out far enough to permit valve 101 to seat. The adjustment of the control mechanism for first and second drive is substantially the same as that for neutral except that clutch 13 must be engaged and the accelerator pedal must be depressed. Depression of the accelerator pedal shuts off venting through passage 126 so that the fluid will flow from pump 81 through conduit 92 around portion 117 of valve 106 and through passages 128, 130 and 125 to conduit 105, the flow from passage 125 to conduit 105 being through bore 107 around the reduced portion 119 of the selector valve. Fluid flowing into tube 47 will contact brake band 45 so that it engages brake drum 42 to hold the planetary carrier 34 stationary. As the carrier cannot turn in a retrograde direction, drive will be from the first runner 16, clutch 24, shaft 18 to gear 26, and from such gear to gears 29, 31 and 28 driving shaft 20 in a forward direction. Shaft 20 is connected with shaft 21 through the torque-speed mechanism and drives such shaft and shaft 22 in a forward direction. The drive may come from runner 17, shaft 19, gears 27, 30, 31 and 28 to shaft 20. The runners 16 and 17 are in series so that the fluid flow therethrough will act initially through runner 16 to drive the planetary gearing in the low speed gear ratio but as the fluid pressure increases in the fluid clutch, runner 17 will take over the drive so that second speed drive is provided and when this occurs the unit planet gear will be rotated at a speed driving shaft 18 faster than runner 16 so that it overruns the same through means of the one-way clutch 24. As the vehicle speed is low flyweights 57 will hold valve 101 open so that the fluid from pump 82 will bypass the clutch 50 through passage 99. The shift of the drive between first and second speed takes place automatically in accordance with operating conditions present in the fluid coupling.

The control device positioned to condition the planetary gearing for third or high speed drive is shown in Fig. 6. At some predetermined speed and torque condition the flyweights 57 will move outwardly a sufficient distance to permit valve 101 to seat whereupon fluid from pump 82 and conduit 93 instead of venting through passage 99 as it would in first and second speed drives will be blocked off so that it will have to pass through passage 96 into chamber 97 and will thereby move piston 98 to engage the clutch plates 55 against the releasing action of springs 79. In the meantime it is necessary to vent the fluid from the first and second speed brake device and this occurs when the pressure reaches 80 lbs. in passage 127 and bore 121, the connection of passage 127 with conduit 93 being around the valve portion 120. This pressure is necessary to engage clutch 50 and it will also act to move valve 123 to the left so that its reduced portion 139 will connect passage 125 with passage 152 and thereby vent any fluid that would otherwise flow to the brake tube 47. Engagement of clutch 50 will lock up the planetary gearing so that the drive will pass to shaft 20 and flange 52 through the clutch housing and also through gears 27, 30, 31 and 28. The planetary gearing will thus rotate forwardly at the same speed as the second runner 17, which except for a small amount of slip, will rotate at substantially the same speed as the impeller 15 driven by crankshaft 14. In the adjustments of the control device for first, second and high speed, the reverse drive conduit 104 will be open to the vent passage 118 around the reduced portion 118 of valve 106 and the vent passage 116 will be closed by valve 106. Likewise under the same conditions passage 127 will be closed by valve 140 so that fluid cannot drain into conduit 133. It is to be noted also that in first, second and high speed adjustments of the control device fluid from pump 81 will flow to conduit 135 through conduit 134 and will be relieved by valve 137 to maintain a pressure of 5 lbs. of fluid flowing to the fluid coupling and this flow will be sufficient to maintain a predetermined volume of fluid in the coupling 11.

When the torque-speed device is in position engaging clutch 50 to condition the planetary gearing for high speed drive its effect may be overcome by pressing the accelerator 147 down beyond wide open throttle position whereupon valve 124 is shifted to carry valve 140 therewith so that its reduced portion will provide a connection through the bore 122 containing valve 124 to relief conduit 133 as shown in Fig. 7. Under such circumstances, valve 140 will be moved to the left so that fluid from pump 82 will drain out through conduits 93 and passage 127, bore 122 and conduits 133 and 134 to thereby relieve pressure against piston 98 so that spring 79 can release the clutch 50. As the pressure is relieved in passage 127 valve 123 will move to the right and shut off venting of passage 125 through passage 152 and fluid from pump 81 will flow through conduit 105 to the tube 47 which will expand and cause contraction of brake band 45 so that it engages brake drum 42 and conditions the gearing for first and second speed drive. As long as the accelerator pedal is held beyond wide open throttle position this lower speed drive will be established by the location of valve 140, but as soon as the accelerator pedal is allowed to return to approximately one-third open throttle position then valves 124 and 140 will return to the positions they occupied during high speed drive so that venting of passage 127 ceases and the clutch is again engaged and conduit 105 to the first and second speed brake device is again vented through passage 152. This adjustment of the mechanism is sometimes called "kickdown." It will be noted that the control mechanism will dictate high speed drive through the planetary gearing but it may be overruled by the operation of the accelerator pedal and the associated valves.

The control mechanism may also be adjusted to provide a positive first or second speed drive as shown in Fig. 8, even though the torque-speed mechanism dictates high speed drive. This adjustment provides a positive lower speed drive and is useful when it is desired to use the engine as a brake such as when going downhill. This adjustment is obtained by adjustment of valve 140 through means of lever 143 and the Bowden wire 144. By pulling the knob on the Bowden wire toward the driver, lever 143 will move the actuator 142 inwardly of the bore for valve 124 and will carry the valve 140 therewith so that its reduced portion provides a connection between passage 127 and conduits 133 and 134. Thus fluid for operating the clutch 50 will be vented as it was in "kickdown" and it will be impossible for the automatic mechanism to establish high speed drive even though the speed-torque conditions may so dictate. When in this adjustment the drive will be in either first or second speed depending upon operating conditions in the fluid clutch as pointed out in the description directed to such driving speeds.

Provision is also made for obtaining a reverse drive at either first or second speed previously described and the adjustment of the control device for obtaining reverse drive is shown in Fig. 9. In order to obtain reverse drive valve 106 is shifted toward the left, looking at the diagrammatic figures, by turning the arm 113 to a position where the reduced portion 118 of the valve provides a connection between conduits 92 and 104. In this valve position conduit 105 is connected to the vent opening 115 around the reduced portion 119 of the selector valve and conduit 93 from pump 82 is connected with the vent passage 116 around the reduced portion 120 of the selector valve. Fluid flowing through conduit 104 will expand the tube 68 and contact brake band 66 to engage brake drum 65 which will hold gear 63 stationary. The carrier 34 is free to rotate and rotation of the planet units around stationary gear 63 will cause a reverse rotation of gear 28, which rotation will be imparted to shaft 20 and through the torque-speed mechanism to shaft 21 so that when clutch 13 is engaged the propeller shaft 22 will be driven in a reverse direction at either first or second speed depending upon whether runner 16 or 17 is doing the driving. Obviously high speed will not be obtainable because the fluid flow to the clutch 50 is vented.

It will be understood that various forms of the invention other than that described above may be used without departing from the spirit or scope of the invention.

What is claimed is:

1. Transmission mechanism comprising drive and driven shafts, planetary gearing connecting said shafts and adapted to produce a low forward speed, a fluid operated brake device for establishing said low speed, a reverse gear meshing with an element of said gearing, a device for braking said reverse gear, a clutch device for locking the planetary gearing, a pressure fluid system connected with said brake and clutch devices, a valve controlling flow to the clutch device responsive to the speed of the driven shaft, a valve automatically actuated by pressure fluid used to engage the high speed clutch for venting the low speed brake, and a manually operable master valve controlling fluid flow selectively to said reverse brake device and said clutch valve device.

2. In a transmission mechanism for motor vehicles the combination with drive mechanism having a fluid coupling means driven by the vehicle motor and connectible with planetary gearing including a multiple gear planet unit and a carrier, means driven by the planetary gearing, a low speed brake normally engaged to prevent retrograde movement of the carrier to establish forward drive, clutch means for locking the planetary gearing, a gear meshing with the planet unit to establish reverse drive when braked, and a normally disengaged brake for said gear, of control means for the brakes and clutch comprising a fluid system having two fluid supply pumps, one driven by the vehicle motor and the other by the planetary gearing driven means, fluid connections between the motor driven pump and the brakes, a fluid connection between the other pump and the clutch, a valve means in the system operable to selectively control fluid flow to the brakes, and a torque-speed controlled valve device controlling fluid flow to the clutch.

3. Transmission mechanism comprising drive and driven shafts, planetary change speed gearing connecting said shafts and including brake means for establishing low and reverse drives and clutch means for establishing a high speed drive through the gearing, a pressure fluid system connected to control the brake and clutch means, a manually operable valve in the fluid system having one position rendering the reverse brake means effective and the low speed brake means and the clutch means ineffective and another position conditioning the low speed brake means and high speed clutch means for operation and the reverse brake means for disengagement, a torque-speed actuated valve in the system controlling fluid flow to the clutch, and a valve automatically actuated by pressure fluid used to engage the high speed clutch for venting the low speed brake means when the clutch is engaged.

4. Transmission mechanism comprising drive and driven shafts and adapted to produce a low forward speed, a fluid operated brake device for establishing said low speed, planetary gearing connecting said shafts, a reverse gear meshing with an element of said gearing, a device for braking said reverse gear, a clutch device for locking the planetary gearing to provide a direct drive through the gearing, a pressure fluid system connected with said brake and clutch devices, a valve controlling flow to the clutch device, means responsive to the speed of, and torque transmitted through, the driven shaft for controlling the valve, a valve automatically actuated by pressure fluid used to engage the high speed clutch for venting the low speed brake, and a manually operable master valve controlling fluid flow selectively to said brake device and said clutch valve device.

5. In a transmission mechanism for motor vehicles having a fluid coupling power input means driven by the vehicle motor and connected with planetary gearing conditioned through means including brakes for establishing forward or reverse drive to output means, control means for the brakes comprising a fluid system having a fluid pump driven by the input means, valve means operable to connect the pump with the forward brake and to shut off fluid flow to the reverse brake in one position of adjustment, and to open the system between the pump and the reverse brake and shut off fluid flow to the forward brake in another position of adjustment, additional valve means for opening the system between the pump and the forward brake, centrifugally operated means driven by the output means and connected to the additional valve means to operate the said additional valve means in accordance with the speed of the vehicle and means responsive to the torque transmitted through the output means for opposing the centrifugally operated means.

LE ROY H. FRAILING.

REFERENCES CITED

The following references are of record in the file of this patent:

UNITED STATES PATENTS

| Number | Name | Date |
|---|---|---|
| 725,223 | Crawford | Apr. 14, 1903 |
| 787,908 | Ford | Apr. 25, 1905 |
| 924,956 | Ball | June 15, 1909 |
| 1,026,448 | Marston | May 14, 1912 |
| 1,883,500 | Bjorndal | Oct. 18, 1932 |
| 2,021,550 | Haycock | Nov. 19, 1935 |
| 2,055,325 | Woolson | Sept. 22, 1936 |
| 2,091,391 | Hale | Aug. 31, 1937 |
| 2,329,724 | Maurer | Sept. 21, 1943 |
| 2,332,593 | Nutt et al. | Oct. 26, 1943 |
| 2,343,955 | Cotterman | Mar. 14, 1944 |
| 2,346,365 | Duffield | Apr. 11, 1944 |
| 2,352,212 | Lang et al. | June 27, 1944 |
| 2,355,427 | Duffield | Aug. 8, 1944 |
| 2,402,248 | Hale | June 18, 1946 |

FOREIGN PATENTS

| Number | Country | Date |
|---|---|---|
| 631,833 | France | Sept. 20, 1927 |